Nov. 15, 1966     G. SIEBOL     3,285,121
BLIND RIVET
Original Filed Dec. 28, 1961     2 Sheets-Sheet 1
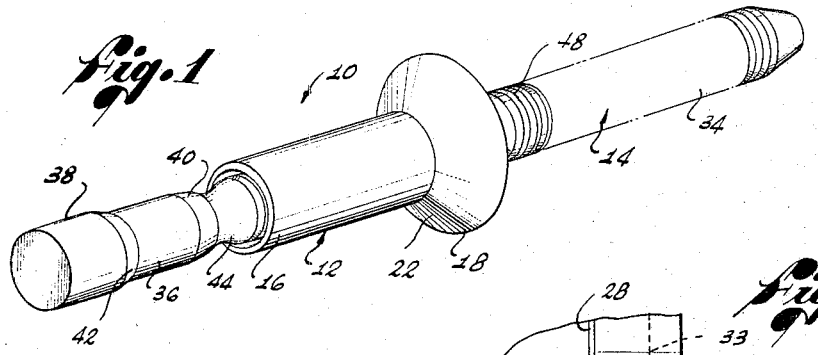
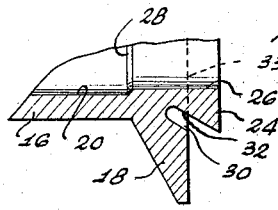
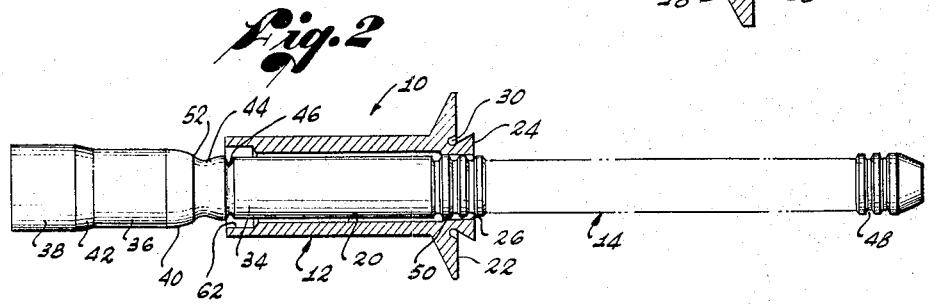
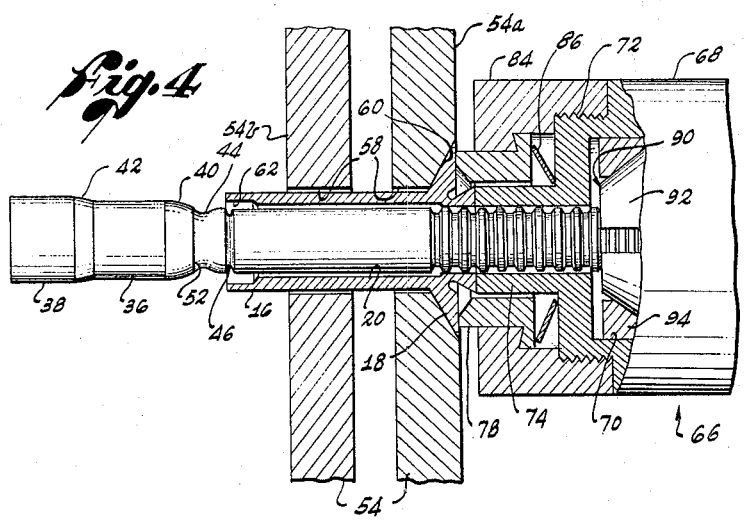
INVENTOR.
GEORGE SIEBOL
BY *Fulwider Mattingly & Huntley*
ATTORNEYS

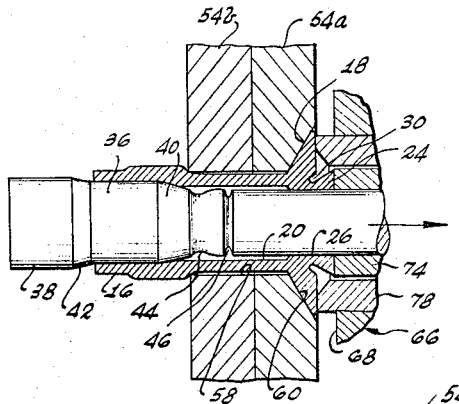

United States Patent Office 3,285,121
Patented Nov. 15, 1966

3,285,121
BLIND RIVET
George Siebol, 2877 Shady Glen Lane, Orange, Calif.
Continuation of application Ser. No. 162,791, Dec. 28, 1961. This application May 19, 1965, Ser. No. 459,523
8 Claims. (Cl. 85—72)

This application is a continuation of my prior copending application Serial No. 162,791, entitled, Blind Rivet, and filed December 28, 1961, which is now abandoned.

This invention relates to rivets, and more particularly to an improved blind rivet, which is especially adapted for the riveting of work piece configurations, where access may conveniently be had from one side only. The side of the work from which the rivet is applied is often referred to as the "top side" and will be so referred to herein. The other side of the work is generally called the "blind" side.

Most blind rivets presently in use include two basic parts, viz. a tubular member and a setting pin telescopically received in the tubular member. The tubular member is usually called a "sleeve" and embodies a shank and a radially enlarged head integral with one end of the shank and which is seated against the top side of the work when the rivet is installed.

Blind rivets may be generally classified into two classes, one in which the setting pin is driven into the tubular member from the top side and other in which the setting pin is pulled outwardly from the top side to set the rivet. The fasteners discussed herein are of the latter class, i.e., the pull type. The setting pin of a pulltype blind rivet is provided with a "tail" or pulling portion at one end adapted to move relatively freely through the sleeve and projecting at the top side, and a head portion at the blind end having a diameter greater than the internal diameter of the sleeve. Prior to use, the sleeve and pin are assembled with the pin in the sleeve with its pulling portion projecting from the headed end or top side and its head portion located at or near the shank or blind end of the sleeve.

In use, the rivet assembly is inserted from the top side, head portion of the pin first into aligned apertures in the work pieces to be riveted. When properly oriented, the head of the sleeve abuts the top side of the work pieces and the shank of the sleeve, along with the head of the pin, project exteriorly on the blind side of the work pieces. To set the rivet, a pulling force is applied to the tail of the pin and a reactive or restraining force is applied to the head of the sleeve. This serves to draw the head of the pin into the sleeve shank which results in the shank being radially expanded or upset on the blind side to lock or clinch the work pieces together.

It is also desirable in setting a blind rivet to expand the sleeve within apertures in the work pieces into pressure engagement with the walls thereof, thus improving the shear strength of the resulting connection.

Frequently, the work pieces which are to be riveted together are initially separated from each other so that they must be pressed or clinched together simultaneously with riveting. To achieve this end without having to clamp the pieces together by some independent means it is desirable that the projecting portion of the shank on the blind side must be expanded sufficiently to clinch the work pieces together before the shank portion within the apertures is expanded against the walls of the apertures. If this is not done, i.e., if the expansion of the shank portion within the apertures takes place before or simultaneously with the so-called free air expansion of the shank, effective clinching does not take place. That is, premature expansion of the sleeve within the work piece apertures tends to lock them in their separated positions and prevent clinching. Failure properly to clinch the work pieces, precludes the rivet from developing either the desired shear or tensile strength. Therefore, it will be appreciated that a satisfactory rivet of the present type must operate to first clinch the work pieces together and, thereafter, be "upset" to secure them in that position.

In prior devices, after the pin has been moved into the tubular member the desired extent, various means have been employed to stop further pin movement and lock the pin and sleeve together. In some cases, the pulling force is merely discontinued when the desired pin movement has taken place, and friction alone between the contacting surfaces of the pin and sleeve is relied upon for retention of the pin and for maintenance of tensile strength. Other prior rivets embody a sleeve with a reduced diameter, projecting head portion or crown which is swaged radially inwardly against the pin as setting of the rivet takes place. In this latter case, the gripping action of the swaged metal supplements the frictional contact between the pin and the sleeve to retain the parts in assembly and to maintain tensile strength.

In order to leave a final riveted connection which is relatively flush with the exposed top side work pieces without having to trim the pin in a separate operation, it is conventional in the art to provide the pin with a weakened section termed a "breakneck" groove. The pin is arranged to fracture at the breakneck groove when the pulling force thereon reaches a predetermined maximum, whereupon the protruding pulling portion of the pin separates from the remaining portion disposed within the sleeve.

In rivets of the above described type, it has been found that the tensile strength developed is frequently inadequate. A contributing factor of this lack of adequate tensile strength is that the pin and sleeve take on complementary tapered configurations at their juncture surface as the former is drawn into the latter. The resulting taper is so directed that the diameter of the juncture surface increases toward the blind end, thus facilitating retrograde movement of the pin out of the sleeve. Further, the resilient metal in the pin is strained somewhat during setting, so that when the pulling force is rapidly released by fracturing of the pin at the breakneck groove, the pin tends to spring back slightly. As a consequence, clinching force on the work pieces is relaxed somewhat and the joint is apt to become loose. Moreover, the tensile strength of the rivet is greatly reduced. This latter result follows from the fact that with the tapered configurations of the cooperating parts, the gripping or retention force of the sleeve on the pin diminishes very rapidly as the pin backs out of the sleeve.

A problem is also encountered in the situation where swaging of metal radially inwardly against the pin is depended upon to give the necessary tensile strength. The problem here is that the pin is pinched prematurely while still being drawn into the sleeve. The significantly increases the pulling force required to set the rivet and necessitates the use of a more powerful pulling tool. Moreover, it often results in fracturing of the pin at the breakneck groove before the rivet is fully set.

To overcome these problems of inadequate tensile strength encountered in prior rivets, various expedients have been tried. One such expedient which has been partially successful in solving the immediate problem is to provide a locking collar around the pin adjacent the head of the sleeve adapted to be swaged inwardly into a corresponding groove in the pin after it has been pulled the desired distance into the sleeve. Setting of such a rivet is achieved by means of a pulling tool which initially applies the reactive force to the head of the sleeve and then, after the pin is finally positioned, to the locking collar. Thus, the locking collar is not swaged inwardly until the requisite pin movement has already taken place. Although this solution has been somewhat successful, as suggested above, it greatly increases the complexity and, hence, the initial cost of the pulling tool. Besides the cost of the tool, the labor costs involved are also substantially increased by virtue of adjustment of the tool having to be made for each new total thickness of work pieces, or grip length, as it is termed in the art.

In view of the foregoing discussion, it is a primary object of this invention to provide a low cost pull type blind rivet which is adapted to afford a greatly improved riveted connection, as compared to prior blind rivets, particularly with respect to tensile strength.

Another object is to provide a blind rivet of the type described, which functions to establish and maintain high clinching forces on the work pieces riveted.

A further object is to provide a pull type blind rivet embodying a sleeve and an associated setting pin having a breakneck groove at which the pin is adapted to fracture when tension reaches a predetermined maximum level, the two parts cooperating in such a manner that fracturing of the pin of the breakneck groove has virtually no tendency to cause separation of the pin and the sleeve.

It is a further object of this invention to provide a pull type blind rivet characterized in that it is capable of affording a high strength riveted connection in spite of tolerance variations both in the size of the apertures in the work pieces and in the total thickness thereof.

Another object is to provide a rivet which, when fully set, is essentially flush with the exposed top side of the riveted work pieces.

Still another object is to provide a rivet for accomplishing all of the foregoing objects, yet one which is economical both from the standpoint of initial cost and from the standpoint of labor costs incurred in setting it.

It is another object to provide a pull type blind rivet which is adapted to be set by an extremely simple and, hence, inexpensive pulling tool.

These and other objects and advantages of the invention will be better understood by referring to the following detailed description taken in conjunction with the accompanying drawings in which:

FIGURE 1 is a perspective view of a rivet constructed in accordance with the invention and illustrating the associated sleeve and pin, as assembled for use prior to setting;

FIGURE 2 is a view of the rivet of FIGURE 1, showing the sleeve in longitudinal section and the pin in elevation;

FIGURE 3 is a partial section on an enlarged scale of the headed end of the sleeve;

FIGURE 4 is a view, partially in longitudinal section and partially in elevation, showing the rivet of FIGURE 1 positioned in a pair of spaced apart work pieces to be riveted together and attached to a setting tool at the beginning of the setting operation;

FIGURE 5 is a view similar to FIGURE 4, illustrating the rivet parts in relation to the work pieces at the completion of the first or clinching phase of the setting operation;

FIGURE 6 is an enlarged view similar to FIGURES 4 and 5, illustrating the cooperating parts in relation to the work pieces after an intermediate phase of the setting operation; and FIGURE 7 is an enlarged view similar to FIGURES 4, 5, and 6, illustrating the rivet as finally set in the work pieces.

Referring to the drawings and in particular to FIGURE 1, the rivet of the invention is indicated generally by the reference numeral 10. In the position shown in FIGURE 1, the "blind" side of the rivet is on the left and the "top side" to the right. As may be seen, the rivet 10 includes two basic parts. One of these is a sleeve 12 and the other a setting pin 14. The construction of the sleeve and pin, as well as the manner in which they cooperate to provide a secure joint, are described in detail below. Satisfactory results may be achieved when the two basic rivet parts are formed of a variety of different metals. However, aluminum alloys have been found to yield particularly advantageous results.

The sleeve 12 includes a shank 16 with a radially enlarged head 18 at one end. The shank is tubular in shape with a concentric axial bore 20.

In the illustrative embodiment of FIGURE 1, the sleeve head 18 is of the so-called countersunk type, however, it will be understood that other types may be used effectively. Being of the countersunk type, the head 18 includes a radially enlarged, frusto-conical flange 22.

As shown in FIGURES 2 and 3, the head 18 has a locking crown 24 projecting axially from the top side of the flange 22 and oppositely of the shank 16. A reduced diameter portion 26 of the bore 20 extends through both the flange 22 and the locking crown 24. As will be explained more fully below, the bore portion 26 in the head 18 is of a smaller diameter than the main portion of the bore 20 to provide an annular stop shoulder 28 (FIGURE 3) at their junction facing toward the blind end of the sleeve.

As may be seen in FIGURES 2 and 3, the flange 22 of the head 18 has an undercut annular groove 30 immediately adjacent to and spaced radially outwardly of the locking crown 24. The groove walls are generally parallel and slope inwardly from top to bottom toward the axis of the sleeve 12, the inner groove wall 32 defining the base periphery of the locking crown 24. For purposes of description, the projecting portion of the crown 24 is considered to be that portion which projects outwardly beyond the plane defined by the top side of the flange 22 and indicated by the reference line 33 in FIGURE 3. By virtue of the slope of the groove wall 32, the crown 24 takes on a generally frusto-conical external shape. The cylindrical bore through the crown 24 gives it minimum and maximum thickness wall sections at its inner and outer ends, respectively.

Turning now to the cooperating setting pin 14, it embodies, in series, a pulling section 34, an expanding section 36, and a blind head 38. The diameters of the respective sections are successively larger, with that of the pulling section 34 being the smallest. At the junction of the pulling and expanding sections 34 and 36, respectively, a tapered annular shoulder 40 is formed. Similarly, a second tapered annular shoulder 42 is formed at the junction of the expanding section 36 and blind head 38.

In order to achieve positive locking of the sleeve 12 and pin 14 after setting, an annular locking groove 44 is provided in the pin and is adapted to receive the locking crown 24, as the latter is buckled or collapsed inwardly in the rivet setting operation. As illustrated in FIGURE 2, the groove 44 is located in the pulling section 34 immediately adjacent the junction of the pulling section and the expanding section 36. To the right of the locking groove 44 in FIGURE 2, the pulling section 34 of the pin has a breakneck groove 46. As discussed above, this last mentioned groove is the weakest section of the pin. To facilitate gripping of the pulling section 34 when setting the rivet, it is preferably formed with a plurality of relatively shallow annular grooves 48 extending from a point adjacent its outer end to a point adjacent the head 18 of the sleeve 12, when the rivet is assembled for use.

Relating the dimensions of the pin 14 to those of the sleeve 12, the diameter of the pulling section 34 is slightly less than the minimum internal diameter of the sleeve 12. With these relative dimensions, the pulling section 34 is free to move through the sleeve 12. In some instances, it may be desired to provide an annular ridge on the pulling section, as in the present case at 50, adapted to be received in an interference or press fit in the sleeve. The purpose of the ridge 50 is to maintain the two parts in the assembled condition of FIGURES 1 and 2 prior to use.

The diameter of the expanding section 36 is greater than the diameter of the bore 20 of the shank 16 in which it is to be received. The still larger diameter blind head 38 has a diameter preferably about equal to, but no greater than the outside diameter of the shank 16. This is to insure that the assembled rivet may be inserted in aligned apertures in the work pieces to be riveted from the top side thereof, it being assumed that the apertures are just slightly larger in diameter than the shank 16.

The relative lengths of the various sections of the pin and the sleeve depend primarily on the combined thicknesses of the work pieces to be riveted, as has been suggested above. In general, the length of the sleeve 12 is preferably at least equal to the length of the pin 14 from the breakneck groove 46 to the terminal end of the blind head 38. This is desired in order to establish frictional contact between the surfaces of the two parts over as great a length as possible. Further, the sleeve 12 is sufficiently long, so that when it is inserted in a plurality of work pieces to be riveted with its head flush on the top side, the blind end of the shank 16 projects at least a small distance on the blind side of the work.

In order to enhance the improved results afforded by the present rivet, the relative hardnesses of the several sections of the pin are preferably equal, except for the particular areas formed with the locking groove 44, the breakneck groove 46, and the pull grooves 48. Such relative hardnesses are established by the particular manner in which the pin 14 is formed. In such forming, a length of wire is first cold formed in a header to give a pin having the general shape of the final product, but for the grooves 44, 46, and 48. After cold heading, the hardnesses of the respective sections differ in accordance with the extent to which they have been extruded or cold worked. As is well known in the art, the greater the cold working, the greater the unit hardness. Accordingly, in the next step of the process, the partially formed pin is annealed to equalize the hardnesses of the various sections.

As a final step in shaping the pin 14, the grooves 44, 46, and 48 are rolled in at their respective positions described above. Forming of the grooves results in the metal of the pin at these grooves being cold worked and thereby hardened. In this regard, it is important to note that since the locking groove is formed immediately adjacent the shoulder 40, the leading edge portion 52 of that shoulder is work hardened. Thus, the unit hardness of the annular leading edge portion 52 of the shoulder 40 in the finally shaped pin is greater than that of the expanding and blind head sections 36 and 38, respectively.

With the foregoing discussion of the construction of the sleeve 12 and pin 14 of the rivet 10 in mind, it is believed that the cooperative association of these members to achieve riveting can be best understood by following through a description of the setting operation. To assemble the rivet for packing and shipment, the pin 14 is inserted, pulling end 34 first, into the shank end of the sleeve 12. The position of the parts after assembly is illustrated in FIGURES 1 and 2, where it will be seen that the pulling section 34 extends through the sleeve 12, and a gripping portion thereof projects from the head 18, whereas the expanding section 36 and the blind head 38 project from the shank 16.

The work to be riveted is assumed, in the present case, to comprise a pair of flat work pieces 54 provided with aligned apertures 58 and intially separated a small distance, as shown in FIGURE 4. Since the head 18 of the sleeve 12 is of the countersunk type, the exposed top side 54a of the work is provided with a mating countersink 60 adapted to receive the head 18. The other exposed side 54b of the work is the blind side. In normal operating circumstances, access may be had to the top side 54a only.

In positioning the rivet for setting, it is inserted from the top side 54a, the blind head 38 of the pin 14 first, through the aligned apertures 58. When finally positioned, the sleeve head 18 is pressed firmly against the top side 54a and the shank 16, as well as the projecting portions of the pin, project on the blind side 54b. In order to achieve maximum strength, the relative diameters of the apertures 58 and shank 16 are such that the shank may be quickly and easily inserted, but with a minimum of free clearance.

To commence the setting operation, pulling force is applied to the pulling section 34 of the pin 14 and a reactive force is applied to the locking crown 24. This causes the expanding section 36 to be drawn into the shank 16 to radially expand or upset the same. This expansion causes an "expansion wave" on the exterior of the shank 16 to move axially from the blind end toward the sleeve head. As the expansion wave reaches the blind side of the work piece, as illustrated in FIGURE 5, the individual work pieces 54 are moved or clinched together. Thus, this phase of the setting operation may be considered as the clinching phase.

As illustrated in FIGURES 2 and 4, the shank 16 is preferably provided with a counterbore 62 at its blind or inner end. The function of the counterbore 62 is to insure that when the tapered shoulders 40 and 42 on the pin enter the shank 16, splitting of the shank does not take place. The shank 16 is less likely to split inwardly of its blind end than that at the end.

Once the work pieces are fully clinched, as in FIGURE 5, the expanding section 36 is drawn into and caused to expand the portion of the shank 16 within the apertures 58 in the work pieces. Increased resistance to expansion is encountered as the sleeve is expanded into pressure engagement with the walls of the apertures 58. Because of this increased resistance, the expanding section 36 is drawn somewhat decreasing its diameter as necessary to permit its continued movement. FIGURE 6 illustrates the rivet parts near the completion of such expansion of the confined portion of the shank 16 and of the resulting wiredrawing of the expanding section 36 of the pin 14. Tolerance variations, particularly in the diameter of the apertures 58 and also in the rivet parts, are accommodated in this manner. That is, by making the expanding section 36 of a diameter larger than that actually required to sufficiently expand the shank 16 into pressure contact with the walls of the apertures 58 and then allowing the excess to be taken up by wiredrawing, tolerance variations are accommodated.

During this last mentioned phase of expansion of the shank 16 and the wiredrawing of the expanding section 36 of the pin 14, the blind head 38 enters and brings about further free air expansion of the inwardly projecting end of the shank. Since the resistance to expansion of the projecting, and hence unconfined, end portion of the shank 16 is relatively small, it expands, and the blind head 38 retains its original shape.

Movement of the pin 14 relative to the sleeve 12 continues under the influence of the pulling and reactive forces, until the pin reaches the relative position shown in FIGURE 6. At this point, the annular work hardened edge 52 of the shoulder 40 abuts the stop shoulder 28 in the sleeve 12. Further movement of the pin 14 into the sleeve 12 at this point meets sharply increased resistance on two separate accounts. To begin with, the reduced diameter portion 26 of the bore in the head 18 would necessitate the sleeve expanding or the pin drawing a relatively greater amount than during prior movement. Secondly, any radial expansion of the sleeve 12 in the area of the bore portion 26 is subject to a relatively high degree resistance due to the increased radial thickness of the head 18, as compared to that of the shank 16. Therefore, since wiredrawing of the pin 14 to the extent required to permit it to move into the bore portion 26 is strongly resisted by the annular work hardened edge portion 52 of the shoulder 40, pin movement stops. It is to be noted that when relative movement ceases, the locking groove 44 of the pin 14 is disposed immediately adjacent the locking crown 24.

When pin movement stops, tension in the pin 14 and compression of the locking crown 24 both increase due to a corresponding increase in the pulling and reactive forces. Referring now to FIGURE 7, it will be seen that the locking crown 24 is so constructed and arranged that when the forces reach a predetermined level, the crown 24 is buckled inwardly into the locking groove 44 of the pin 14. After the groove 44 is filled, the excess material of the crown 24 is flattened into the annular groove 30. It will be appreciated that by suitably forming the cooperating parts, the ratio of the force required to buckle the locking crown 24 to the force required to draw the pin 14 into the shank 16 can be established as desired. In the present case, the ratio is approximately 2 to 1, thereby insuring that the pin moves the requisite distance into the sleeve before such buckling takes place.

An important feature of the present rivet is that just prior to the abutment of the work hardened edge 52 of the shoulder 40 with the shoulder 28, the head 38 of the pin further expands the projecting tail portion of the shank 16 into contact with the blind side 54b of the work. In accomplishing this, the shoulder is deformed somewhat, as may be seen in FIGURE 6, but is not substantially drawn into the portion of the shank 16 confined within the apertures 58. It will be appreciated that in order to effect such expansion without wiredrawing the pin head 38, the length of the expanding section 36 is established in accordance with the total thickness of the work pieces to be riveted.

Furthermore, the grip range of the rivet is controlled by the axial length of the tapered shoulder 42. To elaborate, under minimum grip conditions, the leading edge of the tapered shoulder 42 would be drawn up so as to just force the projecting and radially expanded tail portion of the shank 16 into pressure contact with the blind side 54b of the work around the aperture 58. On the other hand, under maximum grip conditions, the shoulder is deformed somewhat with its leading edge actually slightly entering the aperture 58 and its terminal edge being pulled up relatively close to the plane of the blind side 54b of the work.

The advantage of this additional free air expansion accomplished by the blind head 38 is that it significantly increases the tensile strength of the rivet. As is well known, the greater the area of contact, the less the unit pressure. Accordingly, the greater the area of the shank 16 which is forced into contact with the blind side 54b of the work, the less tendency there is for the rivet to pull back out of the work under the influence of tensile forces tending to separate the individual work pieces 54.

In further regard to strength of the riveted connection, it is to be noted that by virtue of the locking crown 24 being buckled into the cooperating groove 44 in the pin 14, positive locking of the two rivet parts in assembly with one another is effected. The pin 14 is precluded from backing out of the sleeve 12 by this locking relationship, supplemented by the frictional contact between the pin and sleeve. Conversely, the pin 14 is precluded from moving on through the sleeve by the same locking relationship between the buckled crown and pin and by the frictional contact and, in addition, against wiredrawing down sufficiently in size to permit it to move into the portion of the shank 16 confined within the apertures 58 of the work.

Continuing the description of the setting operation, once the locking crown 24 is buckled and flattened to the condition shown in FIGURE 7, tension on the pin 14 further increases as a consequence of the sharply increased resistance to its movement. By suitably forming the pin 14, the breakneck groove 46 can be made to fracture when the forces exceed those required to set the pin by a predetermined amount. Preferably, the forces required to fracture the pin 14 are just slightly greater than those required to finally buckle the locking crown 24. At least a slight difference is necessary in order to insure that the crown 24 is fully buckled and flattened in the manner previously described before the pin fractures. On the other hand, it is desired to minimize this difference in order that the rivet is not subjected to excessive force after it is finally set and also to minimize the power requirements of the tool.

When the tension in the pin 14 reaches the above discussed predetermined level, the pin fractures at the breakneck groove 46, as illustrated in FIGURE 7. This results in the pulling section 34 separating from the remainder of the pin 14 disposed within the sleeve 12 in the plane of the head 18. Preferably, the volume of the initially projecting portion of the crown, i.e., the portion to the right of the reference line 33 in FIGURE 3, is made approximately equal to the combined voids of the locking groove 44 and annular groove 30. With this void-volume relationship, the end face of the crown 24 is disposed generally flush with the head 18 of the sleeve after it is buckled and flattened. Moreover, since the head 18 is here of the countersunk type, the resulting rivet is generally flush with the exposed top side 54a of the work.

It will be recalled from the introductory discussion that when the pin of certain prior rivets fractures, the springback forces tend to separate the pin from the sleeve. An important feature of the present rivet is that once the locking crown 24 is buckled, the pin 14 is effectively gripped at its locking groove 44 and the strain occurring in the rivet thereafter is limited for all practical purposes to the section of the pin between the locking groove 44 and the pulling section where the pulling force is applied. Accordingly, when the pin 14 fractures, any springback takes place essentially only over the short length of the pin between the breakneck groove 46 and the locking groove 44. Moreover, locking of the sleeve 12 and pin 14 in assembly with one another takes place between the locking groove and the opposite end of the pin. Thus, for the first of these reasons, there is practically no springback in the first place. Moreover, any which does occur has virtually no effect on the gripping relationship between the two parts.

A tool 66 for setting the rivet in the manner set forth above is illustrated in FIGURE 5. The primary operational requirement of the tool 66 is that a pulling force be applied to the pulling section 34 and that a substantially equal and opposite reactive force be constantly applied in an axial direction to the locking crown 24.

As shown in FIGURE 5, the tool 66 includes a housing 68 having an axial bore 70. The forward end of the housing is necked down and externally threaded, as at 72. Projecting axially from the forward end of the housing 68 is an annular boss or thrust member 74 which is formed with a central bore 76 coaxial with the bore 70. The bore 76 is of a diameter such that the pulling section 34 of the pin 14 may be received freely therein and such that the forward end of the thrust member 74 may abut the locking crown 24 in setting the rivet.

Concentrically mounted on the thrust member 74 is an annular centering sleeve 78. The function of the centering sleeve 78 is to slip around the locking crown 24 when the tool 66 is being positioned for use to center the thrust member 74 with respect to the locking crown and insure that the pulling and reactive forces are applied in axial directions. To retain the centering sleeve 78 in assembly with the housing 68, it is formed with a radially projecting flange 80 at its rearward end. This flange 80 is adapted to abut a cooperating flange 82 on a retainer sleeve 84 screw threaded on the aforementioned externally threaded portion 72 of the housing 68.

When so mounted, the centering sleeve 78 is free for limited longitudinal movement with respect to the integral thrust member 74 and housing 68. A relatively light leaf spring 86 is disposed between the housing 68 and the centering sleeve 78 and serves to urge the latter to its extreme forward position, wherein it projects forwardly at the forward end wall of the thrust member 74. As shown, the sleeve 78 has sufficient freedom for longitudinal movement to enable it to move inwardly to a rearward position, wherein it is flush with the forward end wall of the thrust member 74. This insures that the reactive force is constantly applied to the locking crown 24 as the latter is buckled inwardly.

A collett-like chuck 90 is provided for gripping the pin 14 and pulling it relative to the housing 68. The chuck 90 includes gripping jaws 92 and a concentrically mounted closing and pulling member 94. The chuck 90 is slidably mounted in the bore 70 of the housing 68 and adapted for movement from the initial operating position, illustrated in FIGURE 5, toward the right in that figure.

The forward ends of the gripping jaws 92, as well as the engaging surface of the closing and pulling member 94, are frusto-conical in shape, so that when an axial force is applied to the member 94 to move it outwardly or to the right in FIGURE 5, the jaws 92 are clamped inwardly toward one another. It will readily be appreciated that when such an actuating force is applied, the jaws 92 clamp the pulling section 34 of the pin 14 and pull the pin in the desired manner. Preferably, the inner walls of the jaws 92 are grooved to mate with the annular grooves 48 on the pulling section of the pin and insure positive gripping. A suitable actuating mechanism (not shown) is provided for so urging the member 94 to the right in FIGURE 5. Such mechanism also operates in a known manner to return the member 94 to its initial position to release the jaws 92 for insertion of a new rivet.

In use, assuming the rivet to have been positioned in the work pieces, the setting tool 66 is simply applied over the projecting pulling section 34 of the pin 14 to the position shown in FIGURE 5. The jaws 92 are initially separated a sufficient amount to receive the pulling section. When the thrust member 74 is positioned in abutment with the locking crown 24, the tool 66 is actuated to move the member 94 to the right with respect to the housing in FIGURE 5. As described above, this serves to clamp the jaws 92 on the pulling section 34 and pull the pin relative to the housing 68 and exert an opposite force on the locking crown 24. Setting of the rivet takes place in the manner described in detail above with the operation being terminated when the pin fractures at its breakneck groove 46, separating the pulling section 34 from the remaining portions of the rivet. When this separation takes place, the pulling assembly 90 preferably springs back to its original position, illustrated in FIGURE 5, whereupon the jaws 92 separate and the broken off portion of the pin 14 is either ejected from the tool 66 or released and drops free of the housing.

From the above description of the setting tool 66 it will be appreciated that it is extremely simple in construction and, hence, inexpensive to manufacture. The use of such a tool to yield the highly effective results obtained in the present case is made possible by the specified rivet parts and the particular manner in which they cooperate in the setting operation. As explained, the tool need only apply pulling force to the pin 14 and reactive force to the locking crown 24 on the sleeve 12. The rivet parts are arranged so that when, under the influence of these forces, the pin 14 is moved the requisite distance in the sleeve 12, movement is automatically stopped and the resistance to pulling rises sharply. This sharp rise in resistance causes the locking crown 24 to be buckled inwardly into locking relationship with the pin. Following this locking of the parts in assembly with one another, the pulling and reactive forces increase the tension in the pin 14. When this tension reaches a predetermined level, the pin 14 fractures at the breakneck groove 46 to terminate the setting operation. Thus, the various phases of the setting operation takes place in desired sequence by virtue of the cooperative relationship of the rivet parts.

Although one embodiment of the invention has been shown and described in considerable detail, it will be understood that various changes in the details of construction and arrangement may be made without departing from the spirit and scope of the invention as defined in the appended claims.

I claim:

1. A blind rivet adapted to be inserted from the top side and set in the aligned apertures in a plurality of work pieces, comprising:

a tubular sleeve including a shank with a radially enlarged head at one end and an axial passageway extending therethrough from end to end, said sleeve being adapted to be inserted into the aligned apertures in the work pieces with said head abutting the top side of the same and with the shank projecting from the opposite blind side of the work pieces;

a pin including, in series, a pulling section initially disposed in said passageway with a gripping end projecting from the headed end of said sleeve, an expanding section of a cross-section greater than that of said passageway and initially projecting from the shank end of the sleeve, and a blind head outward of, and larger in diameter than said expanding section so as to provide an annular tapered second shoulder at the juncture of the blind head and expanding section, said expanding section being adapted upon an axial pulling force being applied to said pulling section and a reactive force opposite to said radially enlarged head to be drawn into said passageway to expand the projecting portion of said shank and, thereafter, the portion thereof disposed within the aligned apertures in said work pieces, said blind head being adapted upon the continued application of such forces to be drawn into the projecting portion of said shank to further expand the same;

first shoulder means on the exterior of said pin axially spaced from said second shoulder toward said pulling section, which is of a unit hardness greater than that of at least said expanding section and said second shoulder, and stop shoulder on the interior of said sleeve adjacent said radially enlarged head engageable to stop pin movement, said expanding section being adapted to be pulled into the blind end of said shank to expand the same and to wiredraw down in diameter and, thereafter, said blind head being adapted to be pulled into said shank to further expand the same with said second shoulder being drawn up adjacent the blind side of the work pieces and deformed to expand the axially aligned portion of the shank into engagement with the blind side of the work pieces, the extent to which said expanding section and blind head are pulled into said shank and said second shoulder is deformed being limited by the leading edge of said first shoulder abutting said stop shoulder in said sleeve; and means adjacent said radially enlarged head for locking said pin against movement relative to said sleeve, and means located on said pin adjacent said first shoulder and between said first shoulder and said pulling section for receiving said locking means.

2. A blind rivet adapted to be inserted from the top side and set in the aligned apertures in a plurality of work pieces, comprising:

a tubular sleeve including a shank with a radially enlarged head at one end and an axial passageway extending therethrough from end to end, said sleeve being adapted to be inserted into the aligned apertures in the work pieces with said head abutting the top side of the same and with the shank projecting from the opposite blind side of the work pieces;

a pin with three successively larger sections including, in series, a pulling section initially disposed in said passageway with a gripping end projecting from the headed end of said sleeve, an expanding section of a cross-section greater than that of said passageway and initially projecting from the shank end of said sleeve, and a blind head, there being a first tapered shoulder at the junction of said pulling and expanding sections and a second shoulder at the junction of said expanding section and said blind head, the unit hardness of the leading edge of said first shoulder being greater than that of the remainder of the pin toward and including said blind head so as to resist wiredrawing, said expanding section being adapted to be drawn into said passageway to expand the projecting portion of said shank and, thereafter, the portion thereof disposed within the aligned apertures in said work pieces, said blind head being adapted to be drawn into the projecting portion of the shank to further expand the same;

stop shoulder means on the interior of said sleeve adjacent said radially enlarged head engageable with the leading edge of said first shoulder to stop pin movement; said expanding section being adapted to be pulled into the blind end of said shank to expand the same and to wiredraw down in diameter and, thereafter, said blind head being adapted to be pulled into said shank to further expand the same with said second shoulder being drawn up adjacent the blind side of the work pieces and deformed to expand the axially aligned portion of the shank into engagement with the blind side of the work pieces, the extent to which said expanding section and blind head are pulled into said shank and said second shoulder is deformed being limited by the leading edge of said first shoulder abutting said stop shoulder in said sleeve;

and means positioned adjacent the top side of said radially enlarged head and engageable with said pin following such stopping of pin movement for locking said pin against movement relative to said sleeve, and means located on said pin adjacent said first shoulder and between said first shoulder and said pulling section for receiving said locking means.

3. A blind rivet adapted to be inserted from the top side and set in the aligned apertures in a plurality of work pieces, comprising:

a tubular sleeve including a shank with a radially enlarged head on one end provided with a locking crown projecting axially in a direction opposite said shank, there being an axial passageway through said sleeve from end to end, said sleeve being adapted to be inserted into the aligned apertures in the work pieces with said head abutting the top side of the same and with the shank projecting from the opposite blind side of the work pieces;

a pin including, in series, a pulling section initially disposed in said passageway with a gripping end projecting from the headed end of said sleeve, an expanding section of a cross-section greater than that of said passageway and initially projecting from the shank end of the sleeve, and a blind head outward of, and larger in cross-section than said expanding section so as to provide an annular second shoulder at the juncture of the blind head and expanding section, said expanding section being adapted upon an axial pulling force being applied to said pulling section and a reactive force opposite to said locking crown to be drawn into said passageway to expand the projecting portion of said shank and, thereafter, the portion thereof disposed within the aligned apertures in said work pieces, said blind head being adapted upon the continued application of such forces to be drawn into the projecting portion of said shank to further expand the same;

and first shoulder means on the exterior of said pin axially spaced from said second shoulder toward said pulling section, which is of a unit hardness greater than that of at least said expanding section and said second shoulder, and a stop shoulder on the interior of said sleeve adjacent its head engageable to stop pin movement; said expanding section being adapted to be pulled into the blind end of said shank to expand the same and to wiredraw down in diameter and, thereafter, said blind head being adapted to be pulled into said shank to further expand the same with second shoulder being drawn up adjacent the blind side of the work pieces and deformed to expand the axially aligned portion of the shank into engagement with the blind side of the work pieces, the extent to which said expanding section and blind head are pulled into said shank and said second shoulder is deformed being limited by the leading edge of said first shoulder abutting said stop shoulder in said sleeve, and means located on said pin adjacent said first shoulder and between said first shoulder and said pulling section for receiving said locking crown whereupon the continued application of such forces results in said crown being buckled into locking relationship with said pin.

4. A blind rivet adapted to be inserted from the top side and set in the aligned apertures in a plurality of work pieces, comprising:

a tubular sleeve including a shank and a radially enlarged head on one end provided with a locking crown projecting axially in a direction opposite said shank, said sleeve having an axial passageway extending therethrough from end to end comprised of a first bore of given diameter substantially coextensive with said shank and an adjoining second bore of reduced diameter substantially coextensive with said head, there being an annular stop shoulder at the junction of said first and second bores;

a pin having a plurality of successively larger diameter sections including a pulling section initially disposed partly within said sleeve, an expanding section of a diameter greater than that of said first bore, and a blind head, there being a shoulder intermediate said pulling and expanding sections, the leading edge of which has a greater unit hardness than that of the remainder of said pin toward and including said blind head, and a tapered annular shoulder intermediate said expanding section and blind head, said expanding section being adapted upon an axial pulling force being applied to said pulling section and a substantially equal and opposite reactive force to said locking crown to be pulled into the blind end of said shank to expand the same and to wiredraw down in diameter in accordance with the resistance to expansion of the shank and, thereafter, said blind head being adapted to be pulled into said shank to expand further the same with said tapered annular shoulder being deformed to urge the axially aligned portion of the shank into engagement with the blind side of the work pieces, the extent to which said expanding section and blind head are pulled into said shank and said tapered annular shoulder is deformed being limited by the leading edge of the shoulder intermediate said pulling and expanding sections abutting said stop shoulder in said sleeve, whereupon the continued application of such forces results in said crown being buckled into locking relationship with said pin.

5. The subject matter of claim 4 further characterized in that the magnitude of the forces required to so buckle said crown is substantially greater than that required to pull said expanding section and said blind head into said shank;

and in that the pin is provided with a breakneck groove adjacent said first shoulder, but toward the top side end of said pulling section, and arranged to be positioned flush with the top side of said head upon such engagement of said leading edge with said stop shoulder, the cross section of said pin being minimum at said breakneck groove whereby the application of such forces of a magnitude greater than that required to so buckle said crown results in the fracturing of said pin at said breakneck groove.

6. A blind rivet adapted to be inserted from the top side and set in the aligned apertures in a plurality of work pieces, comprising:

a tubular sleeve having a shank with a head on one end, said head including a radially enlarged flange and locking crown integral with and projecting axially from said flange oppositely from said shank, there being a recessed annular groove in said flange immediately adjacent to and spaced radially outwardly of said locking crown which is axially convergingly directed toward said shank, whereby said locking crown formed thereby has the general form of a truncated cone, the apex portion of which is integral with said head and the outer conical surface of which is substantially parallel with the adjacent inner surface of said groove, said sleeve having a continuous axial passageway extending therethrough comprised of a cylindrical bore of given diameter in said shank and an adjoining coaxial bore of reduced diameter in said head, there being an annular stop shoulder in said passageway at the junction of said bores;

and a pin including an expanding section of a diameter slightly greater than that of the bore in said shank, a pulling section on one end of said expanding section of a diameter smaller than that of the latter section and adapted to be initially disposed within said sleeve with a gripping end thereof projecting from the headed end of said sleeve and with said expanding section projecting from the shank end of said sleeve, and a blind head on the opposite end of said expanding section of a diameter greater than that of said expanding section, there being a shoulder at the junction of said pulling and expanding sections, an annular locking groove in said pulling section adjacent the shoulder at the junction of the latter with said expanding section and an annular breakneck groove in said pulling section at a location adjacent to and longitudinally spaced from said locking groove toward the gripping end of said pulling section, said expanding section and blind head being adapted successively upon a pulling force being applied to said pulling section and a reactive force being applied to said crown to move into said shank to expand the same until the leading edge portion of the shoulder at the junction of said pulling and expanding sections engages the stop shoulder in said tubular sleeve to sharply increase the resistance to pin movement, whereupon the continued application of such forces results in the said locking crown being buckled into the locking groove in said pin and flattened into the annular groove in said sleeve head and, thereafter, in said pin fracturing at said breakneck groove.

7. The subject matter of claim 6, further characterized in that the volume of the portion of said locking crown projecting outwardly of said sleeve head is approximately equal to the combined voids of the locking groove in said pin and the recessed groove in said sleeve head.

8. A blind rivet adapted to be inserted from the top side and set in the aligned apertures in a plurality of work pieces, comprising:

a tubular sleeve including a shank with a radically enlarged head on one end provided with an integral locking crown projecting axially in a direction opposite said shank, there being a recessed annular groove in the exterior end of said head immediately adjacent to and spaced radially outwardly of said locking crown which is axially convergingly directed toward said shank, thereby providing adjacent, substantially parallel conical surfaces in the groove and locking crown formed thereby, said tubular sleeve having an axial passageway extending therethrough from end to end comprised of a first bore of given diameter substantially coextensive with said shank and an adjoining second bore of reduced diameter substantially coextensive with said head, there being an annular stop shoulder in said sleeve at the junction of said first and second bores;

and a pin initially disposed within said sleeve and including, in series, a pulling section of a diameter at least slightly smaller than that of said second bore, an expanding section of a diameter slightly greater than that of said first bore, there being a shoulder at the junctions of said pulling and expanding sections and a locking groove adjacent thereto but spaced toward said pulling section, and a blind head of a diameter slightly greater than that of said expanding section, said expanding section being adapted upon an axial pulling force being applied to said pulling section and a reactive force being constantly applied to said locking crown to be pulled into said shank to expand the same and to wiredraw down in diameter in accordance with the resistance of expansion of said shank, and said blind head being adapted upon the continued application of such forces to be pulled into said shank to further expand the same, the extent to which said expanding section and blind head are pulled into said shank being limited by the shoulder on said pin at the junction at said pulling and expanding sections engaging said stop shoulder, whereupon the application of such forces causes said locking crown to be buckled into the locking groove of said pin with said locking crown closing said recessed annular groove, followed by sliding of the conical surface of said locking crown wedgingly along said conical surface of said recessed annular groove, into said locking groove of said pin.

References Cited by the Examiner

UNITED STATES PATENTS

| 2,298,203 | 10/1942 | Eklund | 85—72 |
| 2,466,811 | 4/1949 | Huck | 85—78 |
| 2,501,567 | 3/1950 | Huck | 85—78 |
| 2,526,235 | 10/1950 | Huck | 85—78 |
| 2,931,532 | 4/1960 | Gapp | 85—78 |

FOREIGN PATENTS 1,254,584  1/1961  France.

CARL W. TOMLIN, *Primary Examiner.*

EDWARD C. ALLEN, *Examiner.*

M. PARSONS, JR., *Assistant Examiner.*